United States Patent
Cattoen et al.

(10) Patent No.: US 10,295,340 B2
(45) Date of Patent: *May 21, 2019

(54) HEIGHT MEASUREMENT TO VERIFY POSITION OF EQUIPMENT IN A DATA CENTER RACK

(71) Applicant: CA, Inc., New York, NY (US)

(72) Inventors: Francois Marie Bruno Cattoen, Newton, MA (US); Janne Mikko Petteri Koponen, Amersham (GB); Dhesikan Ananchaperumal, Shrewsbury, MA (US)

(73) Assignee: CA, Inc., New York, NY (US)

( * ) Notice: Subject to any disclaimer, the term of this patent is extended or adjusted under 35 U.S.C. 154(b) by 441 days.

This patent is subject to a terminal disclaimer.

(21) Appl. No.: 14/658,554

(22) Filed: Mar. 16, 2015

(65) Prior Publication Data

US 2016/0273903 A1    Sep. 22, 2016

(51) Int. Cl.
*G01B 7/02* (2006.01)
*G01B 21/04* (2006.01)

(52) U.S. Cl.
CPC .................................. *G01B 21/04* (2013.01)

(58) Field of Classification Search
None
See application file for complete search history.

(56) References Cited

U.S. PATENT DOCUMENTS

| 2009/0150123 A1* | 6/2009 | Archibald ........... G06F 17/5004 |
| | | 703/1 |
| 2009/0219536 A1* | 9/2009 | Piazza ..................... G01S 5/16 |
| | | 356/445 |
| 2013/0027529 A1* | 1/2013 | Li ........................... G06K 9/26 |
| | | 348/61 |

* cited by examiner

*Primary Examiner* — Tung S Lau
(74) *Attorney, Agent, or Firm* — Sage Patent Group

(57) ABSTRACT

Verification of placement of equipment that has been installed in a rack of a data center is performed by obtaining data indicating a placement location of equipment to be installed in a rack of the data center, and verifying that the equipment has been installed in the installed rack unit position that corresponds to the placement location, based upon an equipment height measurement. Related methods, devices, and computer program products are provided.

15 Claims, 14 Drawing Sheets

HEIGHT MEASUREMENT TO VERIFY POSITION OF EQUIPMENT IN A DATA CENTER RACK

BACKGROUND

Various embodiments described herein relate to computer program products, methods and devices and, more specifically, to data center computer program products, methods and devices.

A data center may be a large physical space used to house computer systems and associated components such as communications and storage systems. Data centers are proliferating across the world with the increase in use of technology, such as the Internet, virtualization and cloud computing. A data center can provide advantages, such as hosting large numbers of equipment in a small space, which can also provide simplified cabling, a controlled environment (such as air conditioning and fire suppression), redundant or backup power supplies and security. Data center equipment may include a variety of devices such as telecommunications systems, data storage systems, servers, network storage devices, computing devices, network routers, network gateways, wireless/wired network interface devices, etc. The data center equipment are generally arranged in racks, which themselves may be arranged in aisles of the data center. The data center configuration may be transient as different equipment may be added, removed, and/or relocated in the data center. Data center operators need to establish accurate records of the various equipment and their locations in the data center.

SUMMARY

Some embodiments of the present inventive concepts are directed to a computer program product that comprises a non-transitory computer readable storage medium storing computer readable program code, which, when executed by a processor of an electronic device causes the processor to perform operations including obtaining data indicating the placement location of an equipment to be installed in a rack of the data center. Moreover, in some embodiments, the equipment in an installed rack unit position may be verified as being installed in the placement location, based upon an equipment height measurement of the equipment that has been installed in the rack of the data center.

In some embodiments, verifying that the equipment has been installed in the placement location may include determining the reference height based on a height of an electronic device at a calibration location. Verifying that the equipment has been installed in the placement location may include determining the equipment height measurement of the equipment based upon a height of the electronic device at an equipment measurement location adjacent the equipment, generating an installed rack unit position based on the equipment height measurement and the reference height, and verifying that the installed rack unit position corresponds to the placement location.

In some embodiments, generating the installed rack unit position may include estimating respective distances from the equipment position to a plurality of standard rack unit positions based on the equipment height and the reference height. The installed rack unit position may be selected out of a plurality of standard rack unit positions, based on the respective distances. In some embodiments, selecting the installed rack unit position may include selecting the nearest standard rack unit position that is associated with the smallest one of the respective distances.

According to some embodiments, estimating respective distances may include determining respective standard heights for the plurality of standard rack unit positions with respect to the reference height, and estimating the respective distances based on the difference between the respective standard height and the equipment height measurements.

In some embodiments, selecting the installed rack unit position may include determining the installed rack unit position out of the plurality of standard rack unit position based on selecting a smallest one of the respective distances whose corresponding standard height of the respective standard heights is less than the equipment height measurement. Verifying that the installed rack unit position corresponds to the placement location may include selectively providing an indication that the rack unit position matches the placement location.

In some embodiments, the operations may further include selectively generating a successful installation indication in response to verifying that the installed rack unit position corresponds to the placement location. Other embodiments may include selectively generating an incorrect installation indication in response to verifying that the install rack unit position corresponds to a location different from the placement location. The calibration location may include a location on the floor of the data center near the equipment or on a portion of the rack in which the equipment has been installed that is not adjacent the equipment that has been installed. In some embodiments, determining the reference height may include associating the reference height to a reference value.

In some embodiments, obtaining data indicating the placement location of the equipment may include receiving a work order and determining the placement location based on the work order. The placement location may include an aisle location and a rack unit position.

Other embodiments may further comprise obtaining an occupation status of the placement location and selectively generating, in response to the occupation status corresponding to the placement location being occupied, a fault report, an occupied alarm, or an indication that the work order cannot be completed.

Still other embodiments may further comprise obtaining the occupation status of the placement location and selectively generating, in response to the occupation status corresponding to the placement location being not occupied, an indication to place the equipment. The operations may further include receiving an indication that the equipment has been placed.

According to some embodiments, the operations may further include providing an indication of the status of installation of the equipment based on verifying that the equipment has been installed in the installed rack position that corresponds to the placement location. Providing the indication of the status of installation may include selectively generating an indication that the equipment is an incorrect position, responsive to verifying that the equipment has been installed in an incorrect placement location. An incorrect position counter may be incremented. Some embodiments may include selectively generating, in response to determining that the incorrect position counter is greater than the threshold number of retries, one or more of a notification to remove the equipment, and alarm indicating the incorrect position, or a notification that the work order is incomplete. In response to determining that the incorrect position counter is not greater than the threshold number of retries, a notification to move the equipment may be selectively generated.

Some embodiments of the present inventive concepts include a method including obtaining data indicating a placement location of an equipment to be installed in a rack of the data center, and verifying that the equipment has been installed in an installed rack unit position that corresponds to the placement location, based upon an equipment height measurement of the equipment that has been installed in the rack of the data center. The obtaining and verifying may comprise operations performed by a processor. The verifying that the equipment has been installed in the placement location may include determining a reference height based on the height of the electronic device and a calibration location.

In some embodiments, verifying that the equipment has been installed in the placement location may include determining the equipment height measurement of the equipment based upon a height of the electronic device at an equipment measurement location adjacent the equipment, generating the install rack unit position based on the equipment height measurement and the reference height, and verifying that the installed rack unit position corresponds to the placement location. Other operations according to any of the embodiments described above may also be performed.

Some embodiments of the present inventive concepts include an electronic device. The electronic device may include a user interface, a processor, and a memory coupled to the processor and comprising computer readable program code that when executed by the processor causes the processor to perform operations such as obtaining data indicating a placement location of an equipment to be installed in a rack of the data center, and verifying that the equipment has been installed in an installed rack unit position that corresponds to the placement location, based upon an equipment height measurement of the equipment that has been installed in the rack of the data center. Other operations according to any of the embodiments described above may also be performed.

It is noted that aspects described with respect to one embodiment may be incorporated in different embodiments although not specifically described relative thereto. That is, all embodiments and/or features of any embodiments can be combined in any way and/or combination. Moreover, other devices, methods, and/or computer program products according to embodiments will be or become apparent to one with skill in the art upon review of the following drawings and detailed description. It is intended that all such additional devices, methods, and/or computer program products be included within this description, be within the scope of the present invention, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Figure 1:
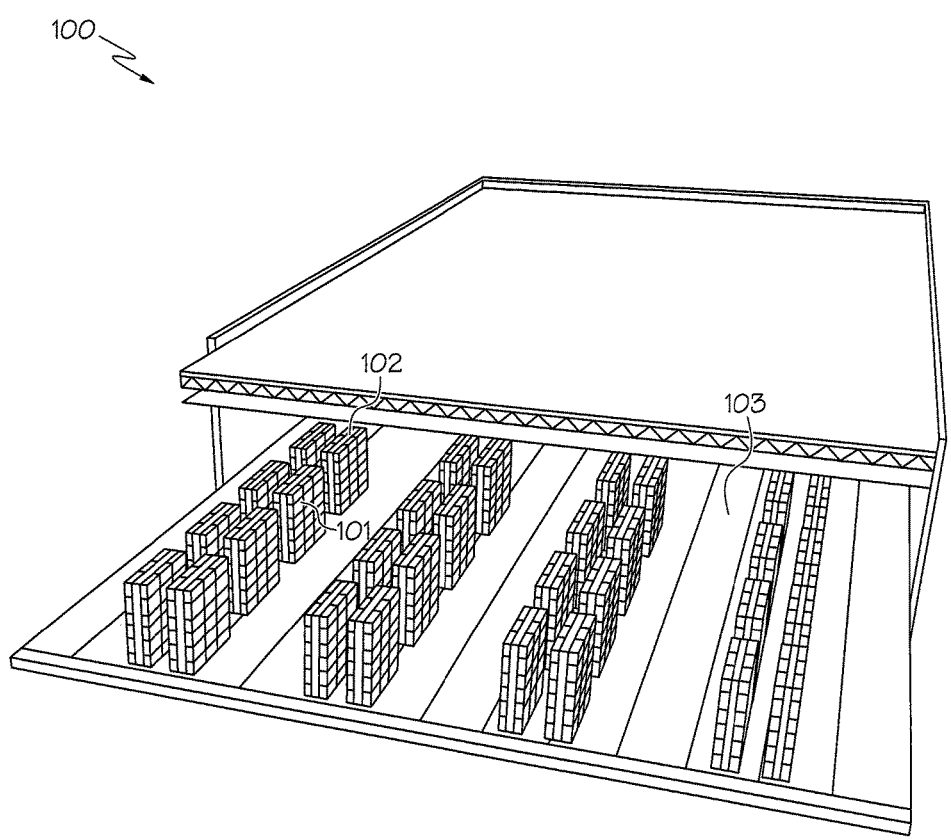
FIG. 1 is a an illustration of a data center according to some embodiments of the present inventive subject matter.

Various embodiments will be described more fully hereinafter with reference to the accompanying drawings. Other embodiments may take many different forms and should not be construed as limited to the embodiments set forth herein. Like numbers refer to like elements throughout. Numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As noted above, data centers are proliferating around the world with increased demand for higher speed data communication. Data centers may include a multitude of data center equipment such as telecommunications systems, data storage systems, servers, network storage devices, computing devices, network routers, network gateways, wireless/wired network interface devices, etc. As used herein, the term "equipment" may refer to one or a plurality of equipment in the data center. A data center may include, for example, thousands of equipment housed in a single physical facility. The equipment may generally be arranged in racks, which themselves may be arranged in aisles of the data center. These equipment may be physically moved, removed from service upon fault detection, and/or temporarily taken out of service for maintenance. Personnel/technicians associated with the data center routinely receive work orders that provide instructions regarding installation of equipment in a specific location in the data center and/or movement of equipment from one location to another.

Various embodiments described herein arise from the recognition for a need to verify that the equipment has been installed in a placement location. Once a given equipment is installed in a rack, data center operators may desire to verify that the equipment has been placed in the proper location in the rack in order to improve performance of the overall data center. As used herein, a data center operator may be a person, business entity, hardware, and/or software and any combination thereof, responsible for the operations of a data center. Verifying that the equipment installed in a data center rack is in a proper position within the rack may be particularly challenging since equipment mounting locations within a rack may be closely spaced. Equipment mounting locations within a rack may be standardized. For example, the Electronic Industries Alliance (EIA) standard server rack is 19 inches wide with rack mount rails which are 17¾" (450.85 mm) apart and a distance between mounting locations of 1.75" (44.45 mm). A vertical distance of 44.45 mm may be referred to as 1U. A standard 42U rack has an internal rack unit height dimension of 73.5 inches (1.8669 m). Such closely spaced rack unit positions may lead to errors through inaccurate placement of the equipment in the rack by the data center technician executing a work order. Various embodiments described herein provide methods, devices, and computer program products to verify that the equipment has been installed in a correct location in the rack based on height measurements of the equipment.

Referring now to FIG. 1, a data center 100 is illustrated, according to some embodiments described herein. The data center 100 may be a facility to house computer systems, network, and/or associated equipment. The data center may include data center equipment 101, also referred to herein as "equipment", such as communications equipment including data networking equipment, telecommunications equipment, storage systems, servers, routers, gateways, and/or equipment racks arranged in aisles, rows, and/or stacked in columns. Data center equipment 101 may include supporting equipment such as power supplies, connectors, wiring, environmental controls such as HVAC, fire suppression equipment, and/or various security devices. The data center 100 may be organized to include one or more aisles 103 that include racks 102 that may hold equipment 101. Data center technicians may receive a work order that provides a specific aisle, rack, and rack unit (U) within the rack for installation of an equipment.

Figure 2:
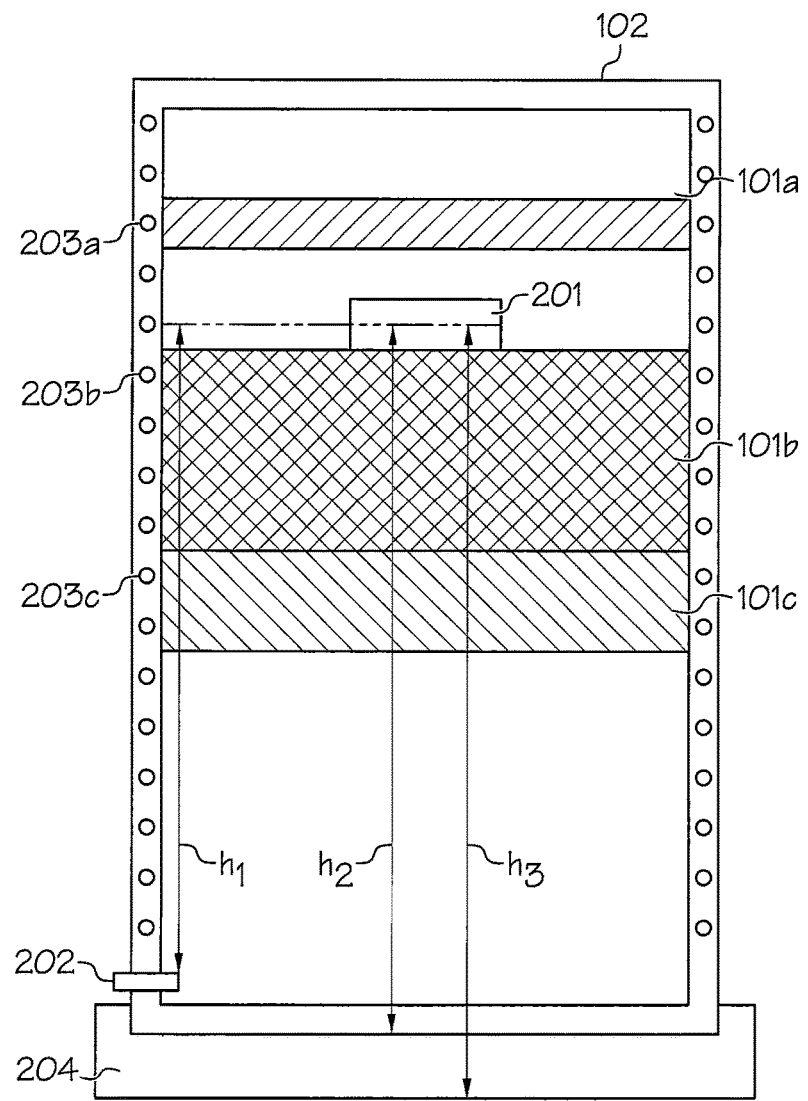
FIGS. 2-3 illustrate racks in the data center of FIG. 1, according to some embodiments of the present inventive subject matter.

Referring now to FIG. 2, a rack 102 that may be included in the data center 100 of FIG. 1 is illustrated. The rack 102 may hold various types of equipment 101a, 101b, and/or 101c. Each of the equipment 101a, 101b, and/or 101c may be placed in the rack 102 at various predetermined rack unit positions 203. Rack unit positions 203 may be spaced apart by a uniform distance. As a working example, as discussed above, rack unit positions 203 may be spaced 44.45 mm apart, according to the Electronic Industries Alliance standard. At this spacing of 44.45 mm, rack 102 may include 42 rack unit (RU) positions. The rack positions may be denoted by mounting holes such as 203a, 203b, and/or 203c, into which the front face of the equipment 101 may be bolted. In some embodiments, slide guides to assist in sliding the equipment into the rack unit position may be used in addition to and/or in lieu of the mounting holes.

In some embodiments, an equipment 101 may occupy one or more rack unit positions. Still referring to FIG. 2, equipment 101a occupies one rack unit position and is installed at rack unit position 203a. Equipment 101b may occupy four rack unit positions and is installed at rack unit position 203b whereas equipment 101c occupies two rack unit positions and is installed at rack unit position 203c. The rack unit position may be based on the center of the mounting hole of the rack unit position 203a, 203b, and/or 203c. Alternatively, the rack unit position may be the top of the mounting hole or the bottom of the mounting hole. Once an equipment 101b is installed in the rack at a rack unit position 203b, an electronic device 201 including a height sensor to measure the height of the installed equipment 101b may be placed on the installed equipment 101b in order to verify that the equipment has been installed at the specified placement location. As described herein, the electronic device 201 also may be referred to as a measurement device 201. In some embodiments, the electronic device 201 may be placed directly on a top surface of the equipment 101. In some embodiments, the electronic device 201 may be placed on a pad that is placed on a surface of the equipment 101. The pad placed on the surface of the equipment may be non-conductive and may electrostatically isolate and/or thermally isolate the equipment 101 from the electronic device 201. In some embodiments, the electronic device 201 that includes a height sensor may be affixed to another surface, different from the top surface, of the equipment 101, for purposes of obtaining a height measurement, as will be discussed in detail in connection with FIG. 6. The electronic device 201 may be placed adjacent and/or in close proximity to the equipment 101 to obtain a height measurement. In some embodiments, the height measurement may account for differences in height measurements based on the location of the electronic device 201 on or adjacent the equipment.

In some embodiments, prior to measuring the height of the installed equipment 101, the height of the electronic device 201 may need to be calibrated. Calibration may be accomplished by placing the electronic device 201 at a calibration location to obtain a reference height. In some embodiments, the reference height may be associated with a reference value such as zero, for ease of relating equipment height measurements to the reference height. The calibration location may be the floor of the data center 100 near the rack 102, on a base or pedestal 204 of the rack 102, and/or at a calibration rest 202 on the rack 102, as illustrated in FIG. 2. The calibration rest 202 may be on a side edge and/or bottom edge of the frame of rack 102. The calibration rest 202 may have a ledge that is suitable for placing the electronic device 201. A height sensor may be included in the electronic device 201. In some embodiments, the height sensor may be physically separated from the electronic device 201 but may be in communication with the electronic device via a wired or wireless connection. The height sensor may be embodied by an application running on a smartphone or other device. For example, an Apple iPhone may use as the height sensor commercially available applications such as Easy Measure, Height Finder, and/or Drop Height.

Still referring to FIG. 2, the height of equipment 101b may be determined by electronic device 201 to be h1 if the calibration location is selected to be calibration rest 202. In some embodiments, the calibration location may be a bottom edge of the frame of rack 102 such that the height of the equipment 101b may be h2. In some embodiments, the calibration location may be the floor of the data center such that the height of the equipment 101b may be h3.

Figure 3:
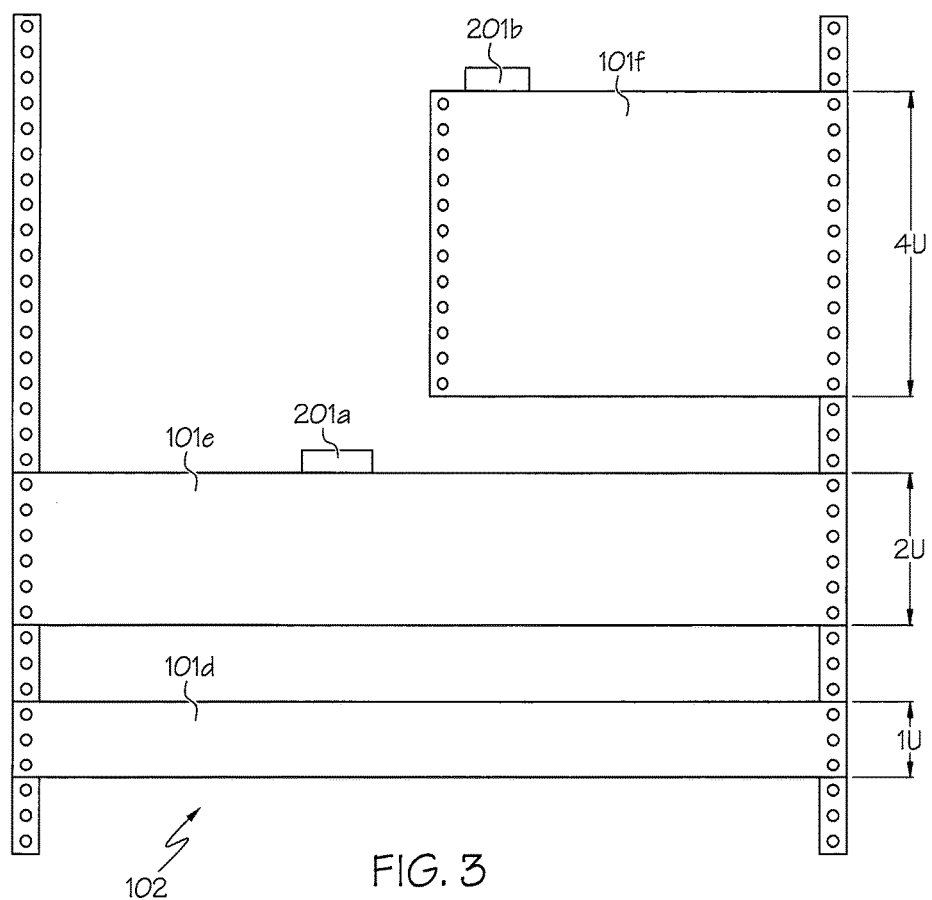

Referring now to FIG. 3, a portion of rack 102 of FIG. 2 that may be included in the data center 100 of FIG. 1 is illustrated. The rack 102 may include one or more equipment 101 of various sizes and profiles. As discussed above, the Electronic Industries Alliance standard specifies that a vertical distance of 44.45 mm within the rack may be referred to as 1 Rack Unit (1U), which represents the space for an equipment in one mounting hole in FIG. 2. For example, equipment 101d occupies 1U whereas equipment 101e occupies two Rack Units (2U). In some embodiments, an equipment 101f may occupy half the width of the rack. Equipment 101f vertically occupies four Rack Units (4U). Once an equipment 101 is installed in a rack, the technician may indicate completion of installation by pushing a button or other indicator on the electronic device 201. The electronic device 201 may then instruct the technician to place the electronic device on or near the equipment 101. An electronic device 201 may be placed on or adjacent any surface of equipment 101. For example, electronic device 201a may be placed anywhere along the top surface of the equipment 101e. Similarly, electronic device 201b may be placed anywhere along the top surface of equipment 101f. If the top surface of the equipment 101e is not available by, for example, being blocked by another equipment in the rack, the equipment may be slid partially out of the installed position so that the electronic device 201a may be placed on top of the equipment 101e. If the equipment may not easily be slid out of the installed position, the technician play hold the device near and/or the equipment 201e, or place the electronic device 201a near a logo or other marking on the equipment 101e.

Figure 4:
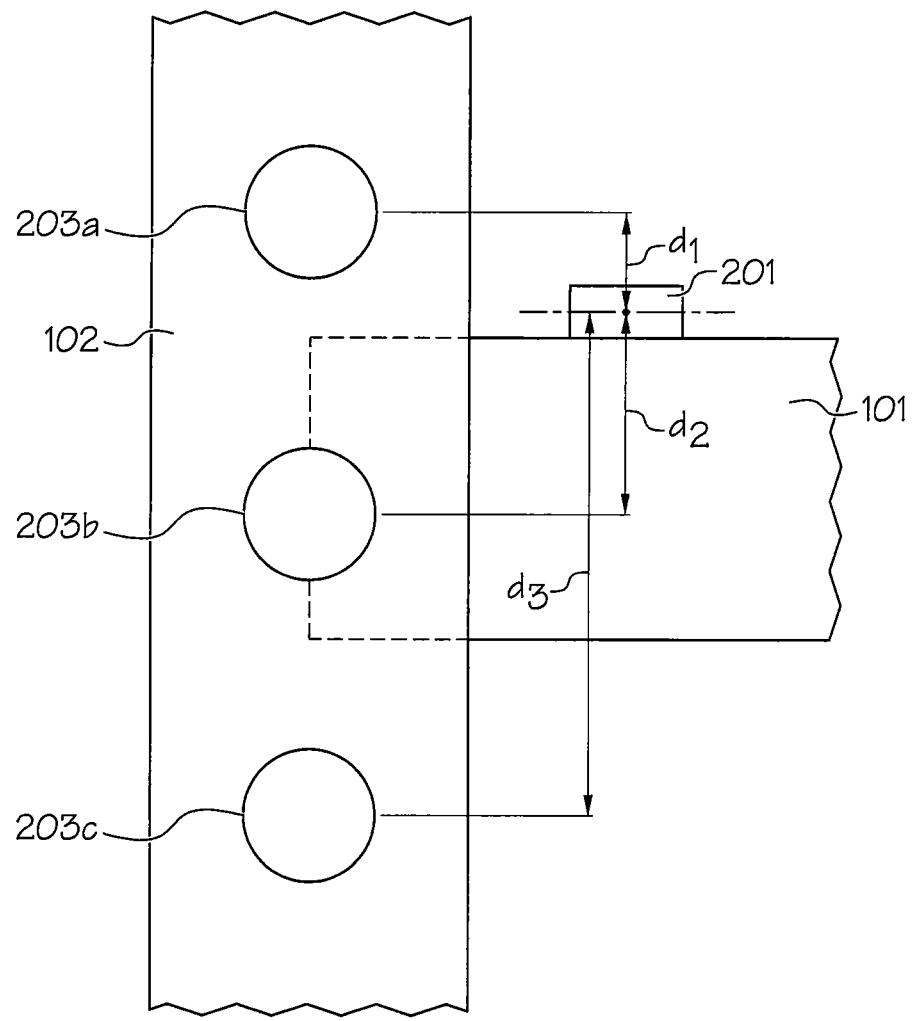
FIG. 4 is a detailed view of the rack of FIGS. 2-3, including an equipment in the data center of FIG. 1, according to some embodiments of the present inventive subject matter.

Referring now to FIG. 4, a detailed view of a rack 102 of FIG. 2 including an equipment 101, is illustrated. An equipment 101, that occupies 1U of rack 102 is illustrated. An electronic device 201 is placed on the top surface of equipment 101. In some embodiments, the height of the equipment 101 may be measured by determining the height from the center of the electronic device 201 to the calibration position and/or the floor of the data center. A plurality of standard rack unit positions 203 may be associated with rack 102. Respective distances from the equipment position to a plurality of standard rack unit positions 203 may be estimated based on the equipment height measurement and the reference height measurement at the calibration position. In some embodiments, the distances may be measured from any combination of the top, bottom, or locations in between the electronic device 201 and/or the standard rack unit position 203.

Still referring to FIG. 4, as a non-limiting example, the distance from the center of the electronic device 201 to the center of the standard rack unit positions 203 may be determined. For example, the distance from electronic device 201 to standard rack unit position 203a may be d1, while the distance from electronic device 201 to standard rack unit position 203b may be d2. The distance from electronic device 201 to standard rack unit position 203c may be d3. The installed rack unit position of equipment 101 may be selected out of the plurality of standard rack unit positions 203a, 203b, and 203c based on the distances d1, d2, d3. As an example, if d1<d2<d3, the installed rack unit position of equipment 101 may be selected to be the nearest standard rack unit position that is associated with a smallest of the respective distances d1, d2, and d3. In this case, since d1 is the smallest distance, the installed rack unit position may be determined to be position 203a. In some embodiments, the installed rack unit position may be based on selecting a smallest one of the respective distances whose corresponding respective standard height is less than that of the equipment height measurement. In the ongoing example, the height of position 203a with respect to the calibration location would be greater than the height of the equipment, since position 203a is higher in rack 102 than equipment 101. As such, in this case, the installed rack unit position may be determined to be 203b, since the standard height of position 203b is less than the height of the equipment 101, as determined based on the height of the electronic device 201. In some embodiments, selection of the installed rack unit positions may be based on standard height of position 203b being greater than the height of the equipment 101.

Figure 5:
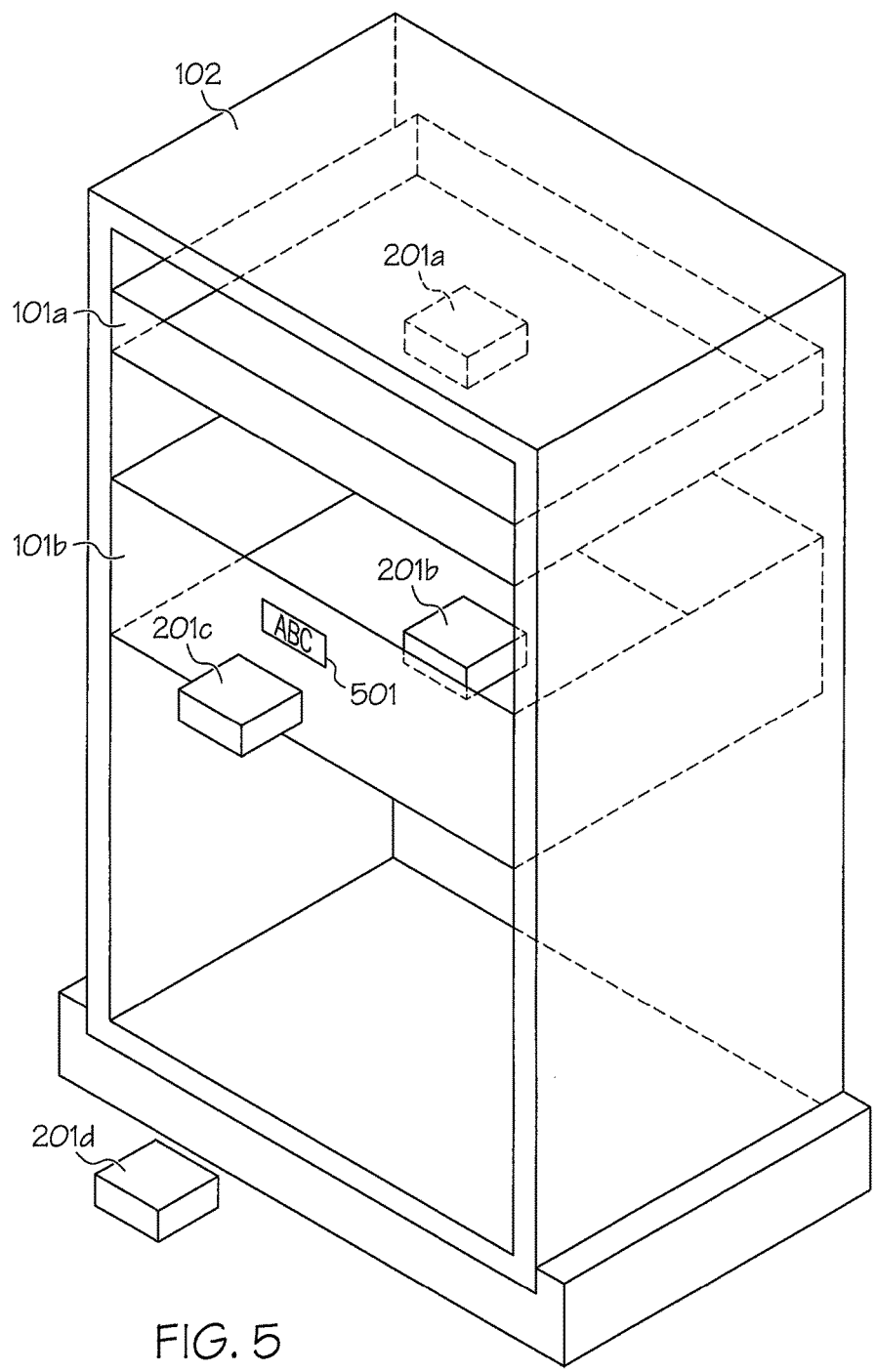
FIG. 5 illustrates a rack including equipment and an electronic device for measuring height, according to some embodiments of the present inventive subject matter.

Referring to FIG. 5, a rack 102 including equipment 101a and 101b is illustrated. The height of equipment 101a may be measured by electronic device 201a that is placed on a top surface of equipment 101a. If the top surface of installed equipment 101a is not readily accessible to place electronic device 201a by the data center technician installing the equipment, the device 201a may be placed on the top surface of equipment 101a prior to installing the equipment 101a in rack 102. In some embodiments, the height of equipment 101b may be measured by placing electronic device 201b on a top surface of equipment 101b. In some embodiments, the technician may receive a message reflecting knowledge of other equipment around the equipment 101a that the technician is installing. Other equipment may be directly adjacent the installed equipment, preventing the technician from accessing the top of the equipment 101a. In some embodiments, if the top surface of the equipment 101b is not easily accessible, electronic device 201c may be placed adjacent equipment 101b. Electronic device 201c may be placed adjacent to a label, logo, and/or a scannable identification tag affixed to equipment 101b. If a scannable identification tag is affixed to equipment 101b, the data center technician may receive an indication that the height measurement by electronic device 201c is acceptable when the scannable identification tag is detected by the electronic device 201c. In other words, the scannable identification tag may provide an approximate location at which the height measurement of the equipment may be made by the electronic device 201c. In some embodiments, electronic device 201d may be placed on the floor of the data center adjacent rack 102 in order to obtain a reference height at a calibration location.

Figure 6A:
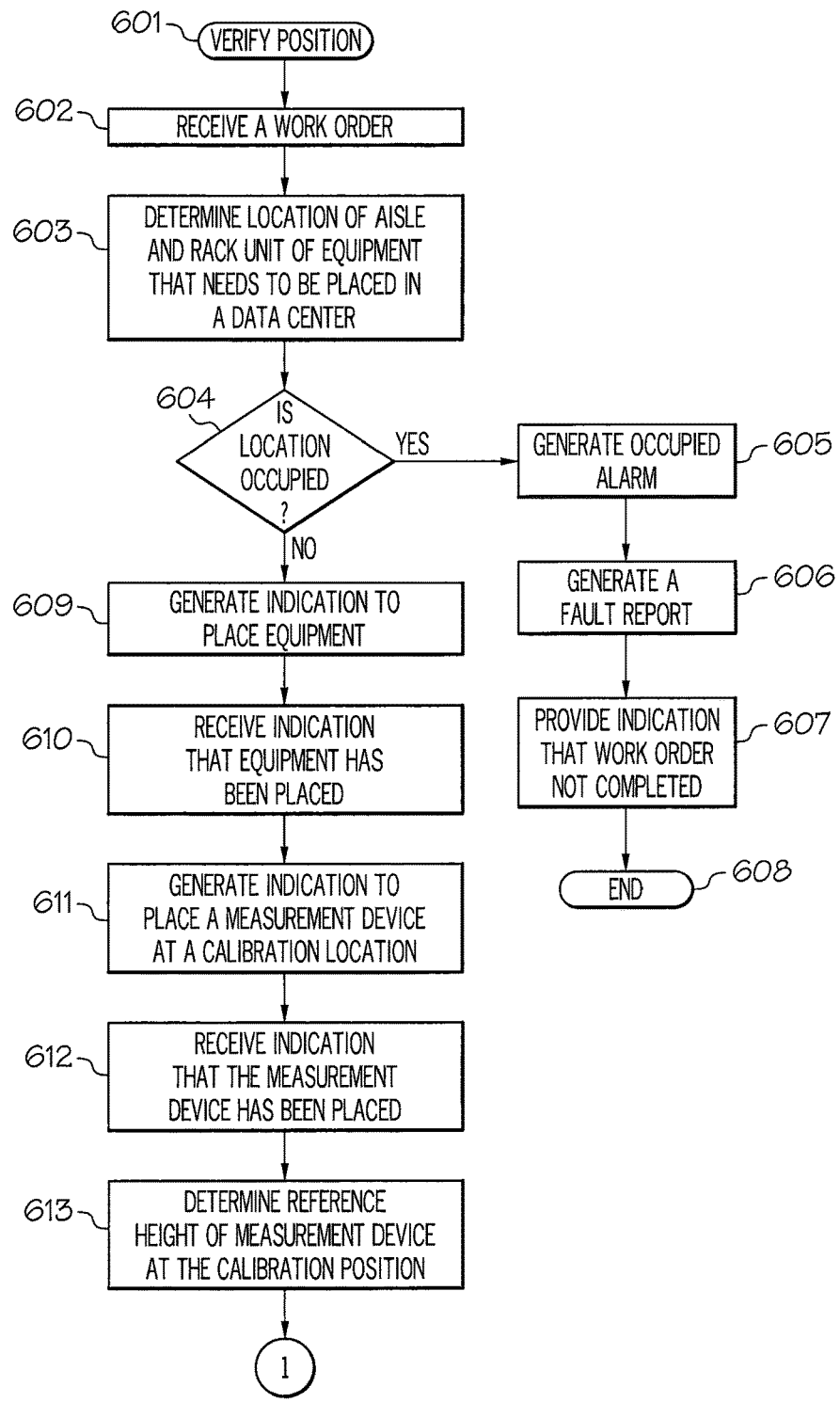
FIGS. 6A-6C is a flowchart of operations that may be performed to verify position of an equipment in a data center, according to embodiments of the present inventive subject matter.
Figure 6B:
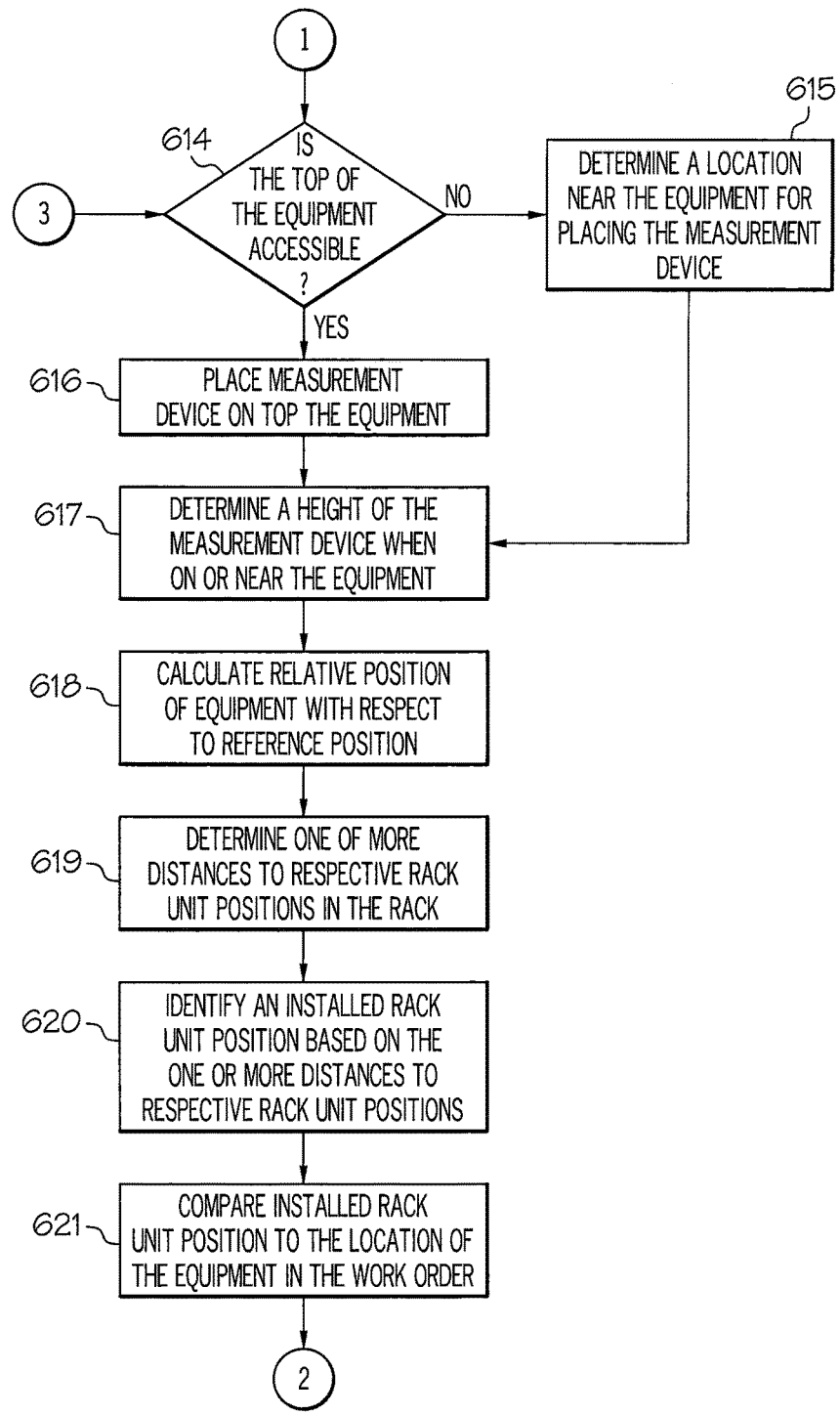
Figure 6C:
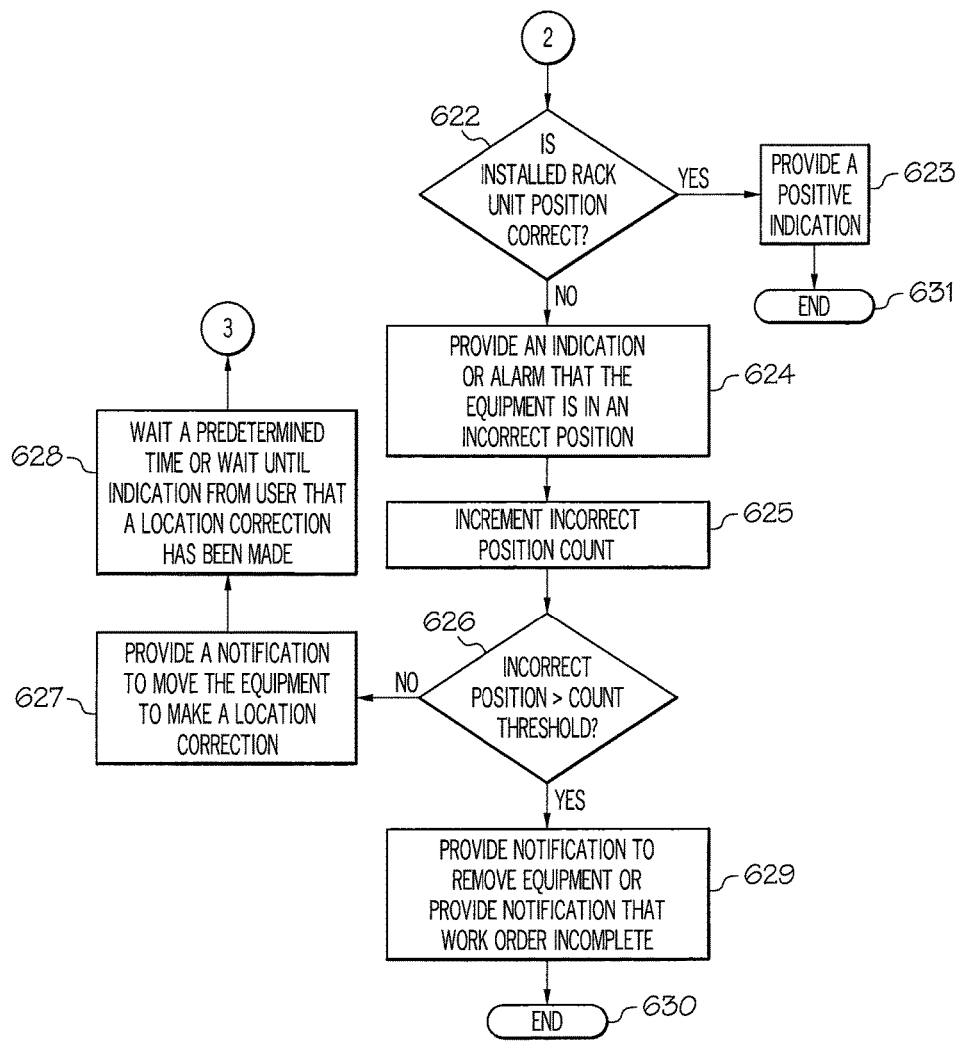

Reference is now made to FIGS. 6A-6C, which is a flowchart of operations that may be performed to verify position of an equipment in a data center (Block 601). In FIG. 6A, a work order from a data center operator may be received by a data center technician (Block 602). The work order may specify that an equipment is to be added, removed, or relocated in the data center. Based on the work order, a placement location in the data center including the aisle and rack unit for the equipment that needs to be placed in the data center may be determined (Block 603). The placement location may be checked to see if it is occupied (Block 604). If the placement location is occupied, an alarm may be generated (Block 605). The alarm may include illumination of an LED or other light source that indicates that the placement location is occupied. In some embodiments, a message alarm and/or an acoustical indication may be provided to alert the data center operator and/or the data center technician that the placement location is occupied. If the placement location is occupied, a fault report may be generated (Block 606). In some embodiments, if the placement location is occupied, an indication that the work order has not been completed may be provided to the data center operator (Block 607). The process may end if the placement location is determined to be occupied (Block 608). It may be left to the data center operator to issue a new or adjusted work order that indicates installation of the equipment in a different, unoccupied location or uninstallation of the occupying equipment.

Still referring to FIG. 6A, if the placement location is determined to be unoccupied, an indication to place the equipment may be generated (Block 609). The data center technician may then place the equipment in the placement location in any of the racks of FIGS. 2-5. Once the equipment has been placed, an indication may be received (Block 610) by the electronic device. An indication to place a measurement device at a calibration location may be generated (Block 611). In response to this indication, the data center technician may place the measurement device at the calibration location as illustrated in FIG. 2. An indication that the measurement device has been placed at the calibration location may be received based on an indication from the data center technician (Block 612). A reference height of the measurement device at the calibration position may be determined (Block 613).

Referring now to FIG. 6B, which is a continuation of the flowchart in FIG. 6A, it may be determined if the top of the equipment is accessible (Block 614). In some embodiments the technician may determine if the top of the equipment is accessible. In some embodiments, the data center operator may determine if the top of the equipment is accessible based on knowledge regarding other equipment in the rack. If the top of the equipment is not accessible, then a location adjacent the equipment for placing the measurement device may be determined (Block 615). If the top of the equipment is accessible, the measurement device may be placed on the top surface of the equipment (Block 616). The height of the measurement device when on or adjacent the equipment, with respect to the reference height at the calibration location, may be determined (Block 617), as illustrated in FIG. 2.

Still referring to FIG. 6B, a relative position of the equipment with respect to the reference position may be calculated (Block 618). This calculation may include subtracting the height of the device at the reference position from the height of the measurement device on or adjacent the equipment, as discussed with respect to FIG. 4. The height of the device may used to determine the rack unit position. In some embodiments, one or more distances to respective standard rack unit positions in the rack may be determined (Block 619). The distances may be based on any combination of measurements from the top, center, bottom, or other location of the measurement device to the top edge, bottom edge, center, or other location of the standard rack unit position. An installed rack unit position may be identified based on the one or more distances to respective rack unit positions (Block 620). An installed rack unit position may be compared to the location of the equipment in the work order (Block 621).

Referring now to FIG. 6C, which is a continuation of the flowchart in FIGS. 6A-6B, it may be determined if the installed rack unit position is corresponds to the placement location (Block 622). If the installed rack unit position is correct a positive indication is provided (Block 623). The positive indication may be associated with a LED or other light source that is illuminated when it is determined that they installed rack unit position is correct. In some embodiments, the positive indication may include a message to the data center operator and/or a message to the data center technician. The positive indication to the data center technician may include a message on the electronic device that was used for the previously described height measurements. No further actions may be necessary after providing a positive indication that the installed rack unit position is correct (Block 631). If the installed rack unit position is determined to be incorrect (Block 622), an indication or alarm is provided that indicates that the equipment is an incorrect position (Block 624). The incorrect indication may include illumination of an LED or other light source that indicates an incorrect installed position at a console of the data center operator and/or at a terminal and/or electronic device used by the data center technician. In some embodiments, a message alarm and/or an acoustical indication may be provided to alert the data center operator and/or the data center technician.

Still referring to FIG. 6C, in some embodiments, an incorrect position counter may be incremented if the installed rack unit position is determined to be incorrect (Block 625). The incorrect position counter may be compared to a threshold count value (Block 626). The threshold count value may represent the number of tries that a data center technician is given to place the equipment in the correct rack unit position of the rack. If the incorrect position counter exceeds the count threshold, a notification may be provided indicating to the data center operator and/or data center technician to remove the equipment (Block 629) and/or abort the attempted installation of the equipment (Block 630). In some embodiments, a notification that the work order is incomplete may be provided to the data center operator and/or the data center technician. If the incorrect position counter is not greater than a count threshold (Block 626), a notification may be provided to the data center operator and/or the data center technician to move the equipment to make a location correction (Block 627). Upon receiving the notification to move the equipment, the data center technician may proceed to remove the equipment and attempt place it in a correct location. Once the equipment has been moved, the data center technician may provide an indication that the location correction has been made. Once the notification to move the equipment has been provided (Block 627), the electronic device may wait a predetermined amount of time and/or wait for an indication from the data center technician that a location correction has been made (Block 628). Once the equipment has been installed in a different corrected location, the procedure to verify the location may be repeated by, for example, returning to Block 614 to determine if the top of the equipment is accessible.

Figure 7:
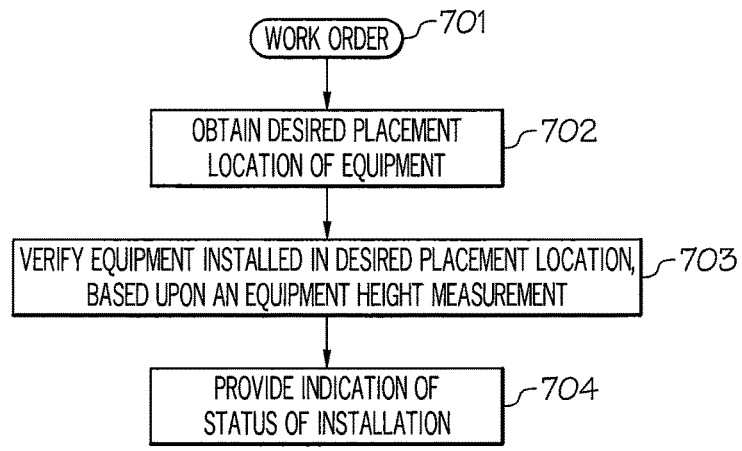
FIG. 7 is a flowchart of operations that may be performed to verify the position of equipment in a data center, according to embodiments of the present inventive subject matter.

Reference is now made to FIG. 7, which is a flowchart illustrating operations for devices, methods, and computer program products, according to some embodiments of the present inventive subject matter. A work order that specifies a placement location of equipment in a data center may be received (Block 701). Receiving a work order may correspond to Block 602 of the flowchart of FIG. 6A. The placement location of the equipment may be obtained (Block 702), as in Block 603 of FIG. 6A. Verification that the equipment has been installed in the placement location may be made based upon an equipment height measurement (Block 703), which may, for example, correspond to Blocks 611-622 of FIG. 6A-6C. Some embodiments provide an indication of the status of installation including a positive or negative indication of the verification of the placement location of the installed equipment (Block 704), as in Block 623 and Block 624 of FIG. 6C.

Figure 8:
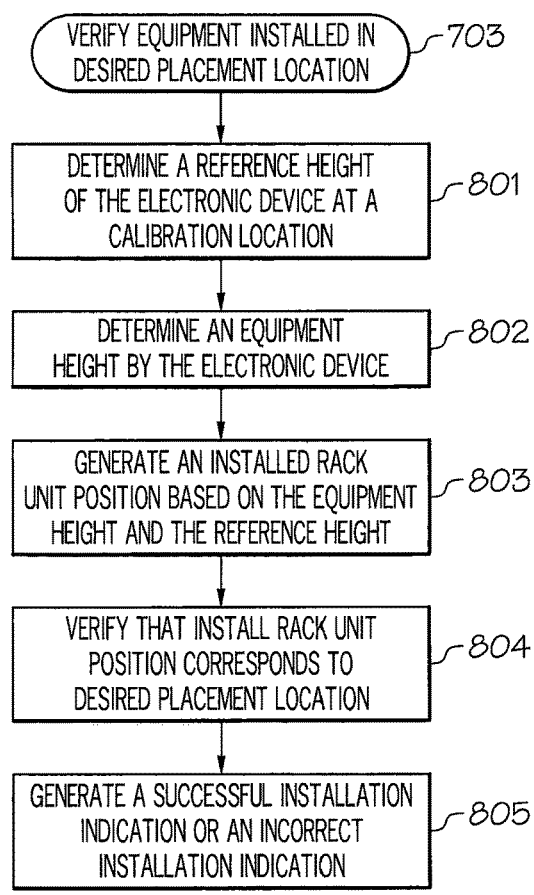
FIG. 8 is a flowchart of operations that may be performed to verify the position of equipment that has been installed, according to embodiments of the present inventive subject matter.

Reference is now made to FIG. 8, which is a flowchart illustrating verification of installed equipment in the data center (Block 703), which may correspond to Blocks 611-624 of FIG. 6A-6C. In some embodiments, verifying that the equipment has been installed in the placement location may include determining a reference height of the electronic device at a calibration location (Block 801), as in Block 613 of FIG. 6A. The electronic device may include a height sensor, Global Positioning System or other location determining circuit, a gyroscope, and/or an accelerometer that may be used to determine the height of the electronic device. The height sensor may include and/or may function in combination with commercially available applications such as Easy Measure, Height Finder, and/or Drop Height. The electronic device may be placed by the data center technician at a calibration location such as the floor of the data center, at the base of the pedestal of the rack, at a bottom edge of the frame of the rack, and/or a calibration rest associated with the rack, as illustrated in FIG. 2.

Still referring to FIG. 8, the equipment height may be determined by the electronic device (Block 802). The height of the installed equipment in the rack of the data center may be determined by placing the electronic device on top of the installed equipment, or at a location adjacent the installed equipment, as illustrated in FIG. 5. An installed rack unit position may be generated based on the equipment height and the reference height determined at the calibration location (Block 803), as discussed in detail with respect to FIGS. 2-5. In some embodiments, the installed rack unit position may be generated based on a difference between the reference height and the equipment height. The generated height of the equipment may be converted to a corresponding rack unit position within the rack. It may be verified that the installed rack unit position corresponds to the placement location that was specified in the work order (Block 804). A successful installation indication or an incorrect installation indication may be generated (Block 805).

Figure 9:
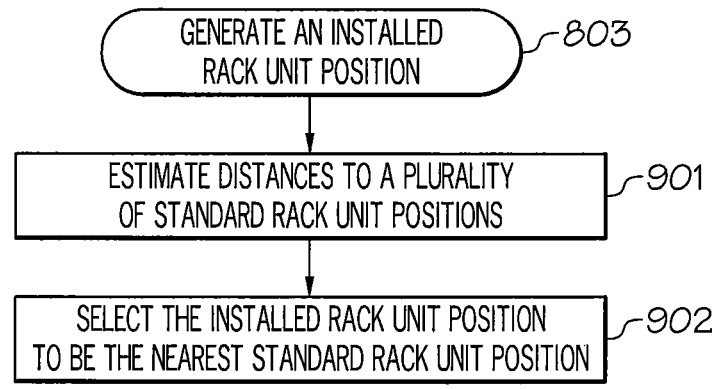
FIG. 9 is a flowchart of operations that may be performed to generate an installed rack unit position, according to embodiments of the present inventive subject matter.

Reference is now made to FIG. 9, which is a flowchart illustrating operations for generating the installed rack unit position (Block 803). Distances to a plurality of standard rack unit positions may be estimated (Block 901), as discussed with respect to FIG. 4. The standard rack unit positions may be spaced 44.45 mm apart, as indicated in the Electronic Industries Alliance standard. In some embodiments, the distances to a plurality of standard rack unit positions may be estimated based on the height of the installed equipment and/or the reference height at the calibration position. Distances from the calibration position to each of the standard rack unit positions may be determined based on standard dimensions of a rack in the data center. Hence, based on the installed equipment height, distances to the plurality of standard rack unit positions may be estimated. The installed rack unit position may be selected to be the nearest standard rack unit position (Block 902). The nearest standard rack unit position may be determined based on the smallest vertical distance between a standard rack unit position and the installed equipment.

Figure 10:
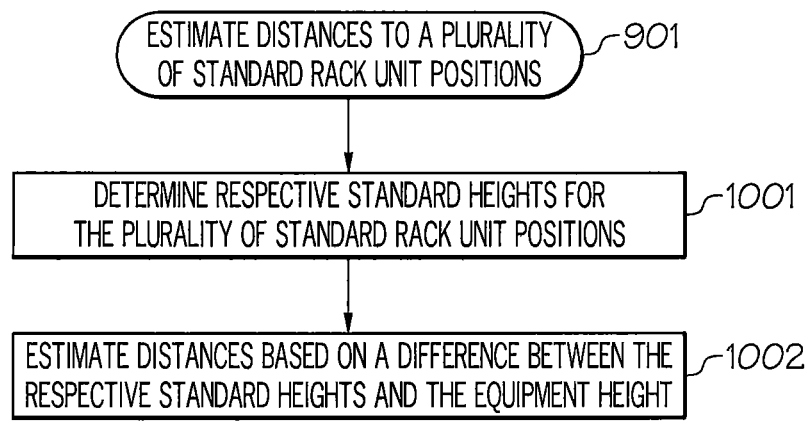
FIG. 10 is a flowchart of operations that may be performed to estimate distances to a plurality of standard rack unit positions, according to embodiments of the present inventive subject matter.

Reference is now made to FIG. 10, which is a flowchart illustrating estimation of distances to a plurality of standard rack units (Block 901), as in Blocks 618-620 of FIG. 6B. Respective standard heights for the plurality of standard regular positions may be determined (Block 1001). The respective standard heights may be determined based on standard rack dimensions as discussed above. The distances to a plurality of standard rack unit positions may be estimated based on the difference between the respective standard heights and the measured equipment height (Block 1002).

Figure 11:
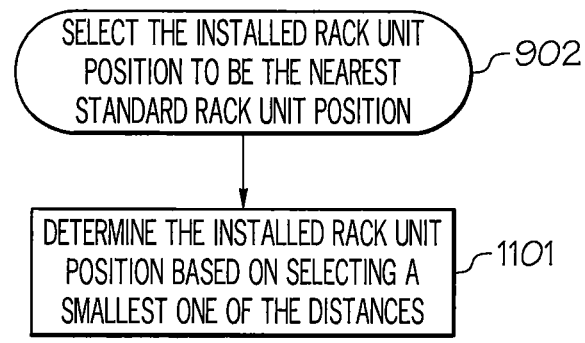
FIG. 11 is a flowchart of operations that may be performed to select the installed rack unit position, according to embodiments of the present inventive subject matter.

Reference is now made to FIG. 11, which is a flowchart illustrating selection of the installed rack position to be the nearest standard rack unit position (Block 902). According to some embodiments, the installed rack unit position may be determined based on selecting a smallest one of the distances to the plurality a standard rack unit positions (Block 1101). In some embodiments, a smallest one of the respective distances may be selected where the corresponding standard rack position height is less than the equipment height measurement. In other words, a rack unit position that is below the installed equipment height may be selected in cases where the installed equipment height is measured by placing an electronic device on the top surface of the equipment.

Figure 12:
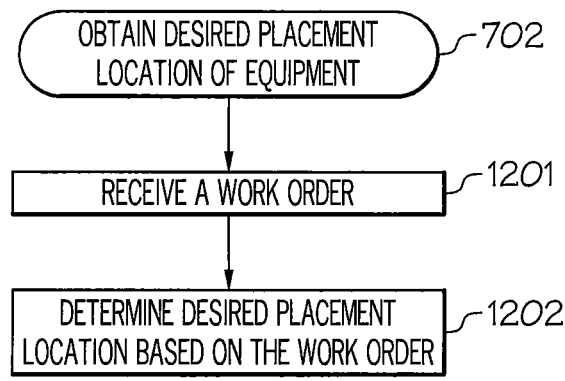
FIG. 12 is a flowchart of operations that may be performed to obtain a placement location of equipment, according to embodiments of the present inventive subject matter.

Reference is now made to FIG. 12, which is a flowchart illustrating obtaining of the placement location of the equipment (Block 702). A work order may be received from a data center operator (Block 1201) as in Block 602 of FIG. 6A. The work order may include details regarding installing, removing, and/or relocating equipment in the data center. The work order may include details such as the type of equipment, connections and/or interfaces to the equipment, an aisle, a rack, a frame within a rack and/or a rack unit position. Based on information provided in the work order, the placement location of the equipment may be determined (Block 1202). The placement location, according to some embodiments, may be specified based on a rack and/or a rack unit position. Some types of equipment may occupy a plurality of rack unit positions, which may be indicated in the work order. If the equipment profile occupies multiple rack unit positions, a specific rack unit position, such as, for example, the position closest to the top of the equipment or the position closest to the bottom of the equipment may be selected as the rack unit position for the equipment.

Figure 13:
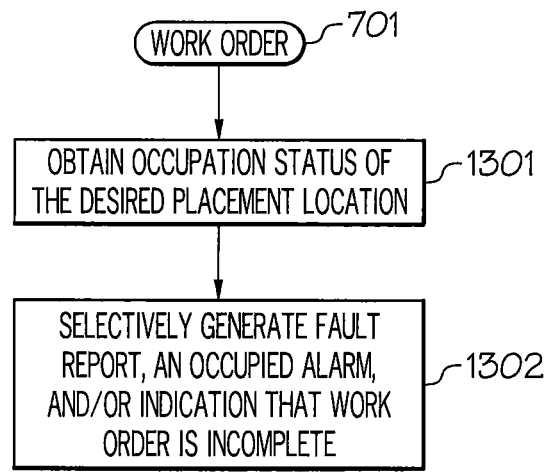
FIGS. 13-14 are flowcharts of operations that may be performed upon receipt of a work order in a data center, according to embodiments of the present inventive subject matter.

Reference is now made to FIG. 13 which is a flowchart illustrating operations when the work order is received from the data center operator (Block 701), as discussed with respect to Blocks 604-607 of FIG. 6A. Based on the placement location that is obtained from the work order, an occupation status may be obtained (Block 1301). The occupation status may be obtained from the data center operator, or be based on the data center technician's physical assessment of the rack. In some embodiments, the occupation status may be obtained based on previous installations in the data center by accessing databases and/or other records that contain information regarding the equipment in the data center. If the occupation status indicates that the placement location is already occupied, a fault report, an occupied alarm, and/or an indication that the work order is incomplete may be selectively generated (Block 1302).

Figure 14:
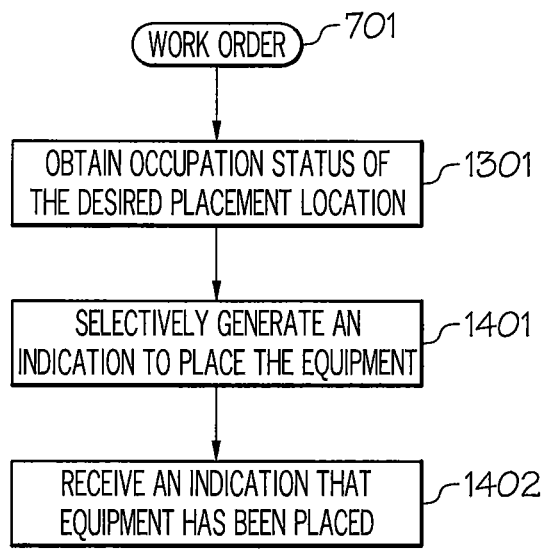

Reference is now made to FIG. 14, which is a flowchart illustrating operations when the work order is received from the data center operator (Block 701), as discussed with respect to Blocks 604, 609, and/or 610 of FIG. 6A. Based on the placement location that is obtained from the work order, an occupation status may be obtained (Block 1301). If the occupation status indicates that the placement location is unoccupied, an indication to place the equipment may be selectively generated (Block 1401). The data center technician may receive the indication to place the equipment and position the equipment in the placement location. Once the equipment has been placed, an indication that the equipment has been placed may be received (Block 1402). The indication that the equipment has been placed may be received by the electronic device or by the data center operator. The indication that the equipment has been placed may be generated by the electronic device, and/or be based on an indication by the data center technician that the installation has been completed. In some embodiments, the indication that the equipment has been placed may be generated when the equipment is determined to be in service as part of a network in the data center.

Figure 15:
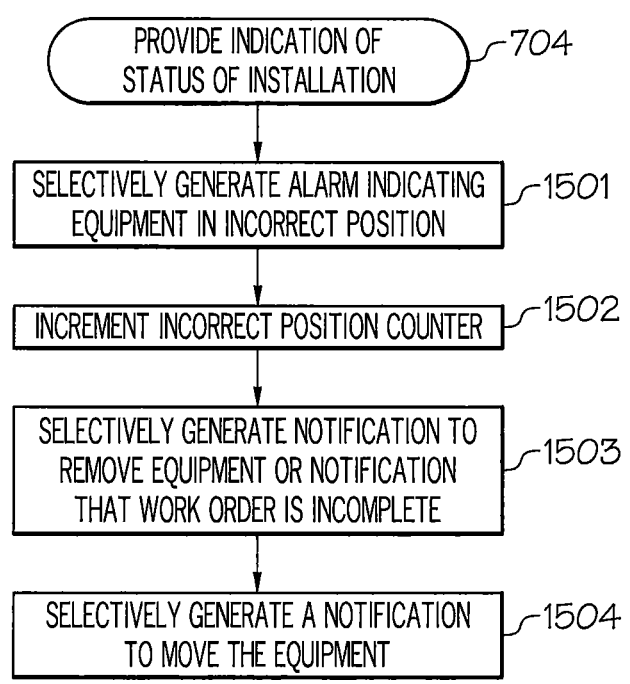
FIG. 15 is a flowchart of operations that may be performed to provide an indication of the status of installation of equipment, according to embodiments of the present inventive subject matter.

Reference is now made to FIG. 15, which is a flowchart illustrating operations for providing an indication of the status of installation of the equipment (Block 704), as discussed with respect to Blocks 624-627 of FIG. 6C. Providing the indication of the status of installation may include selectively generating an indication that the equipment is an incorrect position, responsive to verifying that the equipment has been installed in an incorrect placement location (Block 1501). An incorrect position counter may be incremented (Block 1502). The incorrect position counter may indicate the number of times that the equipment was placed in an erroneous location that did not match the placement location in the work order. Some embodiments may include, in response to determining that the incorrect position counter is not greater than the threshold number of retries, selectively generating a notification to remove the equipment or a notification that the work order could not be completed (Block 1503). In some embodiments, a notification to move the equipment may be selectively generated (Block 1504). This indication to move the equipment may be provided to the data center technician, who may then remove the installed equipment, review the placement location from the work order, and attempt to place the equipment in the correct location in the rack. The data center technician may be given a threshold number of attempts to correctly place the equipment before a fault report is created or an indication of an incomplete work order is sent to the data center operator.

Figure 16:
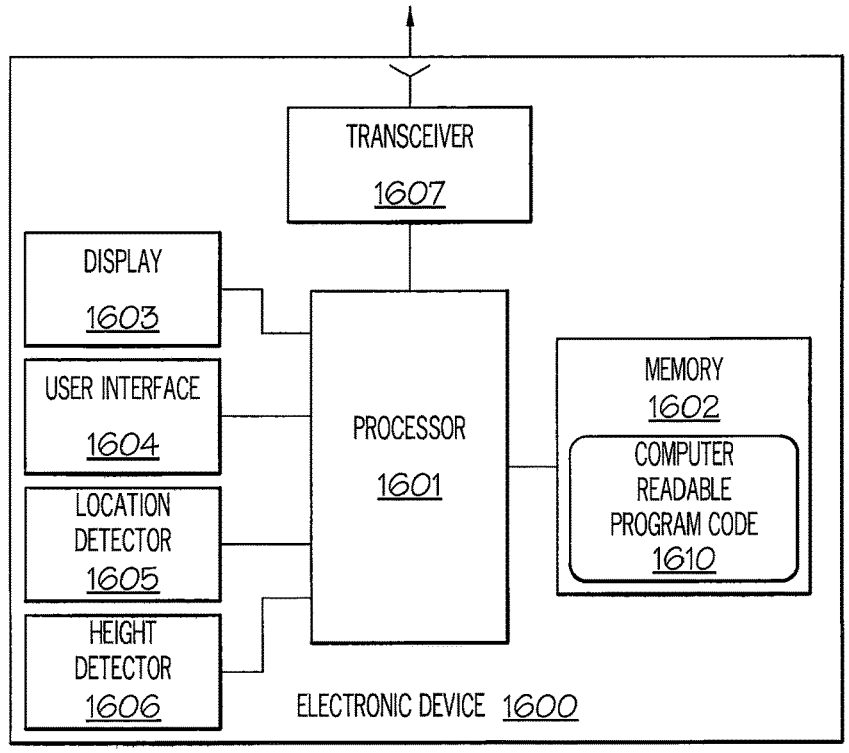
FIGS. 16-17 are block diagrams illustrating devices/modules that may be used according to some embodiments of the present inventive subject matter.

FIG. 16 is a block diagram of an electronic device 1600, for use in the data center, that is configured to verify position of equipment in the data center. The electronic device 1600 may include a processor 1601, a transceiver 1607, a display 1603, ar user interface 1604, a location detector 1605, a height detector 1606, and/or a memory 1602 that includes computer readable program code 1610. The location detector 1605 may include a GPS device, a gyroscope, and/or other location determining circuits. The height detector 1606 may include a height sensor, and accelerometer, and/or a gyroscope that may aid in determination of the height of the electronic device 1600.

Figure 17:
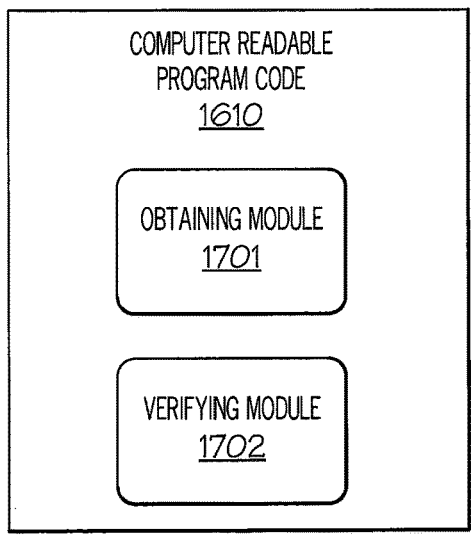

FIG. 17 is a block diagram that illustrates the computer readable program code 1610 in more detail. In particular, the computer readable programming code 1610 may include an obtaining module 1701 to obtain a placement location of an equipment and/or a verifying module 1702 to verify that the equipment has been placed in the correct location in the data center.

EXAMPLE

The following Example shall be regarded as merely illustrative and shall not be construed as limiting the invention. This is an end-to-end Example for installing an equipment in a data center by a technician, as described by FIGS. 1-15.

A technician is to install a new piece of equipment in a data center. The technician's smartphone displays a work order received from the data center operator (Block 602 of FIG. 6A). He installs the equipment and then presses a button on his smartphone to activate testing of the installation (Block 610 of FIG. 6A). The technician then receives a message to "place the smartphone on the floor" (Block 611 of FIG. 6A). Once the technician places the smartphone on the floor in front of the rack, the technician presses a button that activates the calibration measurement to indicate a reference position from which a height measurement of the equipment may take place (Block 612 of FIG. 6A). Once the smartphone has completed taking the calibration measurement, the technician receives a message to "place the smartphone on top of the equipment that has been installed" (Block 616 of FIG. 6A). The technician then places the smartphone on top of the equipment and presses a button on the smartphone to indicate that a measurement may be made. The smartphone then makes a equipment height measurement (Block 617 of FIG. 6B). Based on the equipment height measurement and the reference height at the calibration location, the smartphone determines the installed rack unit position (Block 620 of FIG. 6B). The smartphone then compares the installed rack unit position with the placement location information that was provided in the work order (Block 621 of FIG. 6B). If the installed rack unit position matches the placement location, an indication is provided on the smartphone that the equipment has been verified to have been installed in the correct placement location (Block 623 of FIG. 6C). If the installed rack unit position does not match the placement location, an indication such as an alarm or negative indication message is provided to the technician (Block 624 of FIG. 6C) so that the technician can remove the equipment and retry installation in a corrected location (Block 627 of FIG. 6C). After a given number of incorrect attempts to install the equipment, a message is provided to the technician to remove the equipment (Block 629 of FIG. 6C) since equipment installation in the correct location has failed. After the equipment is removed, an indication may be provided to the data center operator that the work order has not been completed (Block 629 of FIG. 6C).

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python, etc., conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or Block diagrams of methods, apparatus (systems), and computer program products according to embodiments of the disclosure. It will be understood that each Block of the flowchart illustrations and/or Block diagrams, and combinations of Blocks in the flowchart illustrations and/or Block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or Block diagram Block or Blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or Block diagram Block or Blocks. The computer program instructions may also be loaded onto a computer, other programmable instruction execution apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or Block diagram Block or Blocks.

The functions noted in the Blocks may occur out of the order noted in the Figures. For example, two Blocks shown in succession may, in fact, be executed substantially concurrently, or the Blocks may sometimes be executed in the reverse order, depending upon the functionality involved. It will also be noted that each Block of the Block diagrams and/or flowchart illustration, and combinations of Blocks in the Block diagrams and/or flowchart illustration, can be implemented by special purpose hardware-based systems that perform the specified functions or acts, or combinations of special purpose hardware and computer instructions.

It is to be understood that the terminology used herein is for the purpose of describing particular embodiments only and is not intended to be limiting to other embodiments. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and Block diagrams in the Figures illustrate the architecture, functionality, and operation of possible implementations of systems, methods, and computer program products according to various aspects of the present disclosure. In this regard, each Block in the flowchart or Block diagrams may represent a module, segment, or portion of code, which comprises one or more executable instructions for implementing the specified logical function (s). It should also be noted that, in some alternative implementations, the functions noted in the Block may occur out of the order noted in the Figures. For example, two Blocks shown in succession may, in fact, be executed substantially concurrently, or the Blocks may sometimes be executed in the reverse order, depending upon the functionality involved. It will also be noted that each Block of the Block diagrams and/or flowchart illustration, and combinations of Blocks in the Block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the Figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A computer program product, comprising:
a non-transitory computer readable storage medium storing computer readable program code which when executed by a processor of a mobile electronic device operating in a network of a datacenter causes the processor to perform operations comprising:
receiving a request to verify a placement location of an equipment in a rack of a data center from an operator device of the network;
responsive to receiving the request, providing a first indication on the user interface to place the mobile electronic device at a calibration location relative to the rack;
responsive to providing the first indication, receiving a first input to activate a height sensor of the mobile electronic device placed at the calibration location to calibrate a reference height relative to the rack;
responsive to receiving the input, determining the reference height based on a calibration height obtained from the activated height sensor of the mobile device placed at the calibration location relative to the rack;
responsive to determining the reference height, providing a second indication on the user interface to place the mobile electronic device at an equipment measurement location adjacent to the equipment in the rack;
responsive to providing the second indication, receiving a second input to activate the height sensor of the mobile electronic device placed at the equipment measurement location to determine an equipment height measurement of the equipment in the rack;
responsive to receiving the second input, determining the equipment height measurement of the equipment in the rack based on a height obtained from the activated height sensor of the mobile electronic device placed at the equipment measurement location and the reference height;
generating data identifying an installed rack unit position of the equipment based on a comparison of the equipment height measurement to a plurality of standard height positions in the rack;
verifying the installed rack unit position corresponds to the placement location received in the request, based upon a comparison of the installed rack unit position and the placement location; and
communicating the verification to the operator device of the network.

2. The computer program product of claim 1, wherein the generating the data identifying the installed rack unit position comprises:
estimating respective distances from the equipment height measurement to the plurality of standard rack unit positions in the rack; and
selecting the installed rack unit position out of the plurality of standard rack unit positions, based on the respective distances.

3. The computer program product of claim 1, wherein the calibration location comprises a location on the floor of the data center near the rack or on a portion of the rack that is not adjacent the equipment that has been installed in the rack.

4. The computer program product of claim 1, wherein the request comprises a work order; and wherein the operations further comprise:
determining, based on the work order, the placement location,
wherein the placement location comprises an aisle location and a rack unit position.

5. The computer program product of claim 1, wherein the operations further comprise:
providing an indication of a status of installation of the equipment based on the verifying that the equipment has been installed in the installed rack unit position that corresponds to the placement location.

6. The computer program product of claim 2, wherein the selecting the installed rack unit position comprises selecting the nearest standard rack unit position that is associated with a smallest one of the respective distances.

7. The computer program product of claim 2, wherein the estimating respective distances comprises:
determining respective standard heights for the plurality of standard rack unit positions with respect to the reference height; and
estimating the respective distances based on a difference between the respective standard heights and the equipment height measurement.

8. The computer program product of claim 2, wherein the verifying that the installed rack unit position corresponds to the placement location further comprises:
selectively providing an indication that the installed rack unit position matches the placement location based on the comparing.

9. The computer program product of claim 2, wherein the operations further comprise:
selectively generating a successful installation indication in response to the verifying that the installed rack unit position corresponds to the placement location; and
selectively generating an incorrect installation indication in response to the verifying that the installed rack unit position corresponds to a location different from the placement location.

10. The computer program product of claim 4, wherein the operations further comprise:
determining an occupation status of the placement location; and
selectively generating, in response to the occupation status corresponding to the placement location being occupied, a fault report, an occupied alarm, or an indication that the work order cannot be completed.

11. The computer program product of claim 4, wherein the operations further comprise:
   determining an occupation status of the placement location;
   selectively generating, in response to the occupation status corresponding to the placement location being not occupied, an indication to place the equipment; and
   receiving an indication that the equipment has been placed.

12. The computer program product of claim 5, wherein the providing the indication of the status of installation comprises:
   selectively generating an indication that the equipment is in an incorrect position, responsive to the verifying that the equipment has been installed at the placement location indicating an incorrect placement location;
   incrementing an incorrect position counter;
   selectively generating, in response to determining that the incorrect position counter is greater than a threshold number of retries, one or more of a notification to remove the equipment, an alarm indicating the incorrect position, or a notification that the work order is incomplete; and
   selectively generating, in response to determining that the incorrect position counter is not greater than the threshold number of retries, a notification to move the equipment.

13. The computer program product of claim 7, wherein the selecting the installed rack unit position comprises:
   determining the installed rack unit position out of the plurality of standard rack unit positions based on selecting a smallest one of the respective distances whose corresponding standard height of the respective standard heights is less than the equipment height measurement.

14. A method performed a mobile electronic device operating in a network of a datacenter, the method comprising:
   receiving a request to verify a placement location of an equipment in a rack of a data center from an operator device of the network;
   responsive to receiving the request, providing a first indication on the user interface to place the mobile electronic device at a calibration location relative to the rack;
   responsive to providing the first indication, receiving a first input to activate a height sensor of the mobile electronic device placed at the calibration location to calibrate a reference height relative to the rack;
   responsive to receiving the input, determining the reference height based on a calibration height obtained from the activated height sensor of the mobile device placed at the calibration location relative to the rack;
   responsive to determining the reference height, providing a second indication on the user interface to place the mobile electronic device at an equipment measurement location adjacent to the equipment in the rack;
   responsive to providing the second indication, receiving a second input to activate the height sensor of the mobile electronic device placed at the equipment measurement location to determine an equipment height measurement of the equipment in the rack;
   responsive to receiving the second input, determining the equipment height measurement of the equipment in the rack based on a height obtained from the activated height sensor of the mobile electronic device placed at the equipment measurement location and the reference height;
   generating data identifying an installed rack unit position of the equipment based on a comparison of the equipment height measurement to a plurality of standard height positions in the rack;
   verifying the installed rack unit position corresponds to the placement location received in the request, based upon a comparison of the installed rack unit position and the placement location; and
   communicating the verification to the operator device of the network.

15. A mobile electronic device operating in a network of a datacenter comprising:
   a user interface;
   a processor; and
   a memory coupled to the processor and comprising computer readable program code that when executed by the processor causes the processor to perform operations comprising:
      receiving a request to verify a placement location of an equipment in a rack of a data center from an operator device of the network;
      responsive to receiving the request, providing a first indication on the user interface to place the mobile electronic device at a calibration location relative to the rack;
      responsive to providing the first indication, receiving a first input to activate a height sensor of the mobile electronic device placed at the calibration location to calibrate a reference height relative to the rack;
      responsive to receiving the input, determining the reference height based on a calibration height obtained from the activated height sensor of the mobile device placed at the calibration location relative to the rack;
      responsive to determining the reference height, providing a second indication on the user interface to place the mobile electronic device at an equipment measurement location adjacent to the equipment in the rack;
      responsive to providing the second indication, receiving a second input to activate the height sensor of the mobile electronic device placed at the equipment measurement location to determine an equipment height measurement of the equipment in the rack;
      responsive to receiving the second input, determining the equipment height measurement of the equipment in the rack based on a height obtained from the activated height sensor of the mobile electronic device placed at the equipment measurement location and the reference height;
      generating data identifying an installed rack unit position of the equipment based on a comparison of the equipment height measurement to a plurality of standard height positions in the rack;
      verifying the installed rack unit position corresponds to the placement location received in the request, based upon a comparison of the installed rack unit position and the placement location; and
      communicating the verification to the operator device of the network.

* * * * *